(12) United States Patent
Höfling

(10) Patent No.: US 7,350,763 B2
(45) Date of Patent: Apr. 1, 2008

(54) LINEAR SOLENOID WITH ADJUSTABLE MAGNETIC FORCE

(75) Inventor: Klaus Höfling, Lohr (DE)

(73) Assignee: Bosch Rexroth AG, Stuttgart (DE)

( * ) Notice: Subject to any disclaimer, the term of this patent is extended or adjusted under 35 U.S.C. 154(b) by 328 days.

(21) Appl. No.: 11/175,307

(22) Filed: Jul. 7, 2005

(65) Prior Publication Data

US 2006/0017031 A1   Jan. 26, 2006

(30) Foreign Application Priority Data

Jul. 22, 2004   (DE) ...................... 10 2004 035 501

(51) Int. Cl.
*F16K 31/02* (2006.01)
(52) U.S. Cl. .................. 251/129.15; 335/281; 335/298
(58) Field of Classification Search ........... 251/129.15; 335/255, 278, 281, 298
See application file for complete search history.

(56) References Cited

U.S. PATENT DOCUMENTS

| | | | | |
|---|---|---|---|---|
| 2,616,955 A | * | 11/1952 | Dube et al. ............ | 251/129.21 |
| 4,640,391 A | * | 2/1987 | Maehara et al. ....... | 251/129.18 |
| 4,767,097 A | * | 8/1988 | Everett et al. ......... | 251/129.08 |
| 4,830,333 A | * | 5/1989 | Watson ................... | 251/129.18 |
| 5,108,071 A | * | 4/1992 | Hutchings .............. | 251/129.08 |
| 5,407,174 A | * | 4/1995 | Kumar ................... | 251/129.08 |
| 5,758,626 A | * | 6/1998 | Maley .................... | 251/129.18 |
| 5,875,922 A | * | 3/1999 | Chastine et al. ....... | 251/129.15 |
| 7,205,685 B2 | * | 4/2007 | Reichert et al. .............. | 310/14 |
| 2002/0121828 A1 | * | 9/2002 | Ketschau et al. ........... | 310/191 |

FOREIGN PATENT DOCUMENTS

| | | |
|---|---|---|
| DE | 40 22 395 C2 | 1/1992 |
| DE | 102 53.347.4 | * 12/2003 |
| EP | 0 496 844 B1 | 8/1992 |

* cited by examiner

*Primary Examiner*—John Bastianelli
(74) *Attorney, Agent, or Firm*—Oliff & Berridge, PLC

(57) ABSTRACT

A linear solenoid includes a pole tube; a housing jacket that encloses the pole tube; a coil that encompasses the pole tube; and a displaceable armature that is received in the pole tube. An overlap range between the housing jacket and an axially displaceable component that is in operative connection with the pole tube adjusts in order to adjust a magnetic force. The component is adapted to be actuated from outside in a mounted condition of the linear solenoid. The pole tube guides the component axially and the component has an external thread engaged with an internal thread of the housing jacket.

6 Claims, 4 Drawing Sheets

LINEAR SOLENOID WITH ADJUSTABLE MAGNETIC FORCE

The invention relates to a linear solenoid with an adjustable magnetic force and a magnetic valve realized with such a linear solenoid.

A linear solenoid with an adjustable magnetic force is described in DE 40 22 395 C2. An armature is received in a pole tube and spring-biased against a valve seat. The pole tube is enclosed by a coil. The adjustment of the magnetic force is effected through a change of the spring bias. To this purpose, the valve seat is displaced axially, whereby the spring force acting on the armature is reduced or increased.

It is a drawback in this solution that the magnetic force is not modified directly but indirectly by an increase or decrease of the spring bias. It is moreover a disadvantage that the magnetic force can not be adjusted accurately.

Another solution of a linear solenoid having an adjustable magnetic force is shown by EP 0 496 844 B1. This linear solenoid has a housing cap arranged in an axially displaceable manner on a pole body and defining by its circumference an overlap range with a housing jacket. The overlap range constitutes a magnetic flux throttle cross-section limiting the magnetic circuit, so that the latter is increased or reduced in size upon a translation of the housing cap, with the magnetic force changing correspondingly. Following completed adjustment of the magnetic force, the housing cap is enclosed by a plastics jacket and thus immobilized.

It is a drawback in this solution that the magnetic force can not be modified in the mounted condition of the linear solenoid. The magnetic force set during assembly is fixedly determined in later operation.

It is an object of the present invention to furnish a linear solenoid having an adjustable magnetic force, the magnetic force of which may simply and accurately be adjusted during operation, as well as a corresponding magnetic valve.

This object is achieved through a linear solenoid and through a magnetic valve realized with such a linear solenoid.

The linear solenoid of the invention has a linear solenoid for actuating a valve body, with a housing jacket that encloses a pole tube encompassed by a coil. In the pole tube an axially movable armature is arranged. In order to modify the magnetic force, a translatable component is provided that is in operative contact with the pole tube and defines an overlap range with the housing jacket. In accordance with the invention, the component is accessible from outside in the mounted condition of the linear solenoid, so that it may be displaced axially, and the overlap range may be increased or reduced.

It is an advantage of this solution that the magnetic force may be modified or readjusted at any point of time, so that, for instance, a magnetic valve realized with the linear solenoid may quickly and accurately be adapted to various operating parameters. An increase of the overlap range here amounts to an increase of the magnetic force, and vice versa.

A particularly simple solution may be realized by designing the component as a rotary sleeve that is guided on the pole tube axial and has an external thread meshing with an internal thread of the housing jacket. The external thread may have a greater axial extension than the internal thread.

Very accurate adjustment of the magnetic force may be achieved by arranging the rotary sleeve on the pole tube in the range of the armature. Accordingly it is advantageous if, for secure guidance of the rotary sleeve, the pole tube protrudes from the housing jacket at least to such an extent that the rotary sleeve is always guided over its entire inner peripheral surface on the pole tube.

Preferably the rotary sleeve is realized with a radially stepped-back surface of attack for the application of a tool.

The linear solenoid is preferably realized as a proportional magnet having a nearly horizontal magnetic force/armature characteristic line in the working range.

Other advantageous embodiments are subject matter of further subclaims.

In the following, a detailed explanation of a preferred embodiment of the invention is given by way of schematic drawings, wherein.

Figure 1:
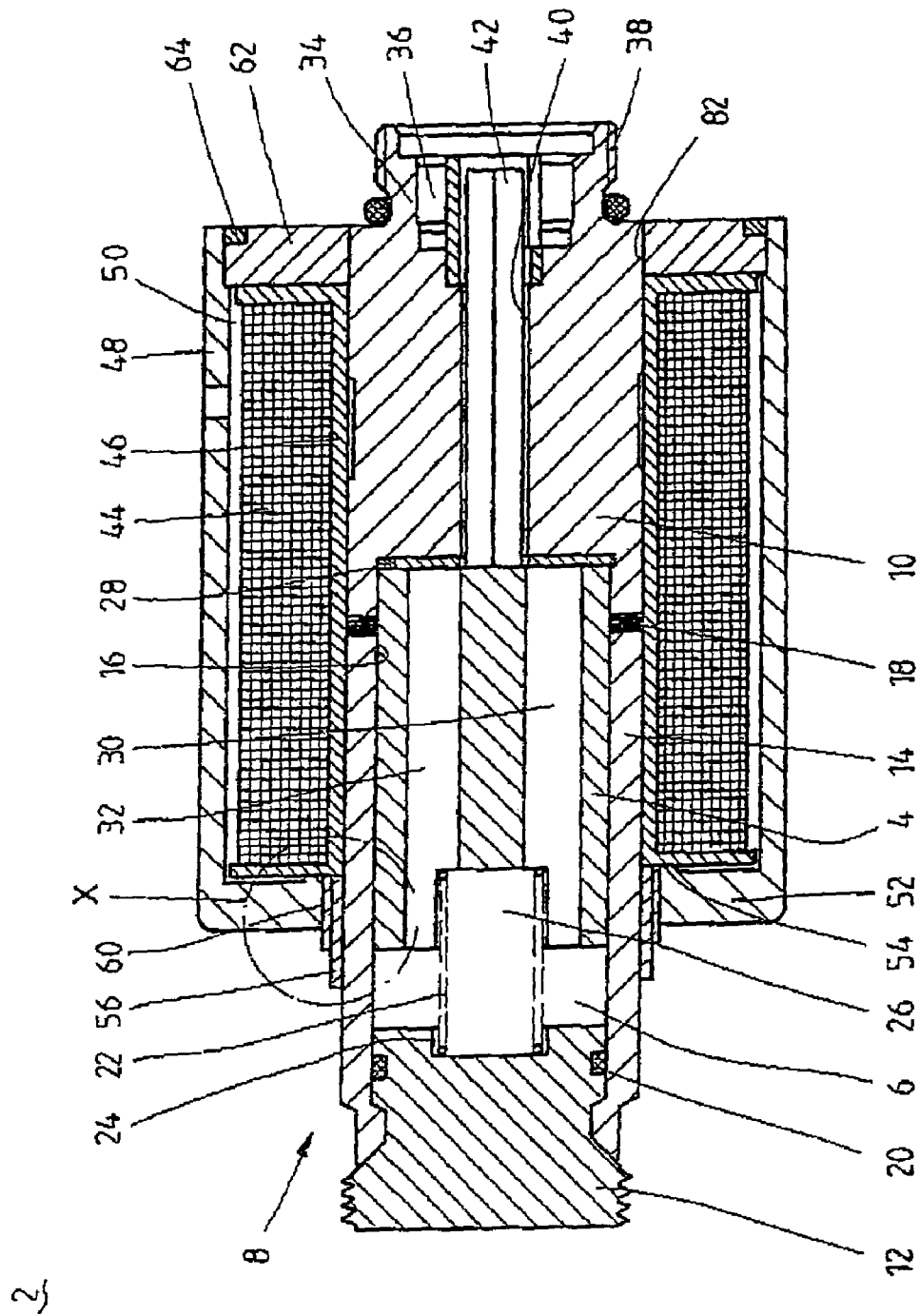
FIG. 1 shows a longitudinal section through a preferred linear solenoid.

FIG. 1 shows a linear solenoid 2 for connection to a known valve housing (not shown). Such valve housings mostly have a biased valve body whereby pressure medium connections may be opened or closed by an axial translation. The linear solenoid 2 has an armature 4 received in an axially displaceable manner in an armature chamber 6 of a pole tube 8 consisting of several parts.

The pole tube 8 has a ferromagnetic pole 10, a lid 12, and a ferromagnetic tube body 14 arranged between the pole 10 and the lid 12. The armature chamber 6 is essentially delimited axially by the pole 10 and the lid 12, and radially by the tube body 14, with the armature 4 plunging into an end face-side recess 16 of the pole 10 in the represented position. Between the pole 10 and the tube body 14 an insulation ring 18, e.g. of plastics, is arranged which conducts the magnetic flux across the armature 4.

The lid 12 is inserted into the tube body 14 by portions thereof, with a seal 20 for sealing the armature chamber 6 being arranged in a peripheral portion of the lid 12.

The armature 4 is biased against a stop disc 28 at the bottom of the recess 16 through the intermediary of a spring 22 that is supported on the bottom of a depression 24 of the lid 12 and plunges into an opposed depression 26 of the armature 4. It is received in the armature chamber 6 with a slight play, so that a radial gap forms between its circumference and an inner wall of the armature chamber 6. In addition the armature 4 is penetrated by two axial compensation bores 30, 32.

The pole 10 has at its free end portion a connection flange 34 with a stepped bore 36 and an external thread 38 adapted to be screwed into a reception of the valve housing. The stepped bore 36 communicates with the armature chamber 6 via a through bore 40 in the pole 10.

The axial bore 40 receives in it an axially displaceable tappet 42 which takes the armature 4 into its de-energized home position to the left in FIG. 1 upon mounting of the valve housing on the connection flange 34 through the biased valve body. This home position is located about in the range of the insulation ring 18 and forms an axial working gap between the armature 4 and the stop disc 28 that defines the stroke of the armature 4.

The pole tube 8 is in portions thereof encompassed by a coil 44 on a non-magnetizable coil support 46 comprised of plastics, for instance. The coil 44 is accommodated inside a coil space 50 radially delimited by a ferromagnetic housing jacket 48. The coil space 50 is axially delimited by a pole disc 62 and by a an end-side bottom 52 of the housing jacket 48.

The pole disc 62 consists of a ferromagnetic material and is provided with a through bore 82. In the assembled condition, the pole disc 62 is inserted on the pole 10 and in the housing jacket 48 together with a seal ring 64. For reasons of manufacture, the inner diameter of the through bore 82 is selected to be somewhat larger than the outer diameter of the pole 10, so that a narrow radial manufacturing gap is formed between the pole disc 62 and the pole 10.

The front end-side bottom 52 has a protrusion 54 axially oriented in the coil space 50, which is contacted by the coil support 46. The bottom 52 is spaced apart from the tube body 14 in a radial direction. In the ring chamber forming between the bottom 52 and the tube body 14, a ferromagnetic rotary sleeve 56 in accordance with the invention is arranged at least in portions thereof.

The rotary sleeve 56 is guided in an axially displaceable manner on the tube body 14, wherein it forms an overlap range 60 with the bottom 52 of the housing jacket 48 for modifying the magnetic force. In order to obtain optimum guiding of the rotary sleeve 56 on the tube body 14, the latter protrudes from the housing jacket 48 to such an extent that the rotary sleeve 56 is always guided on the tube body 14 over its maximum axial length. A more detailed explanation of configuration and function of the rotary sleeve 56 and of the overlap range 60 will be given by referring to FIGS. 2 to 5.

Figure 2:
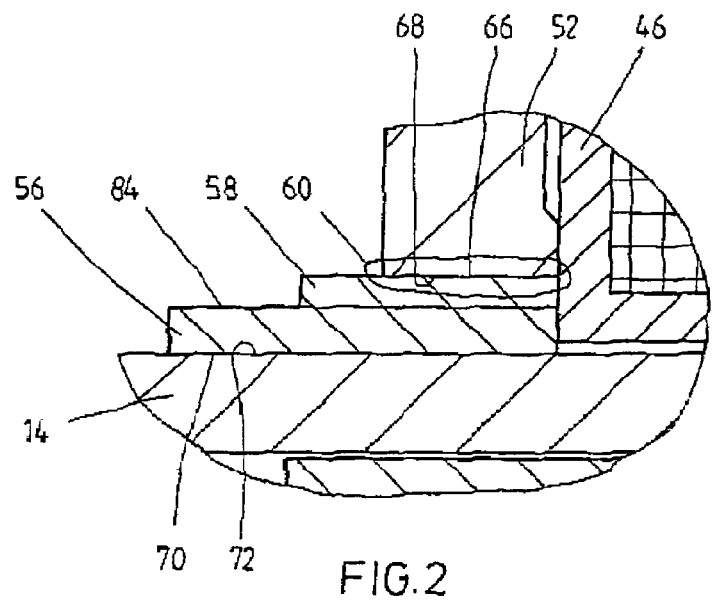
FIG. 2 is an enlarged detail of FIG. 1 with a rotary sleeve of the invention in the basic position.
Figure 3:
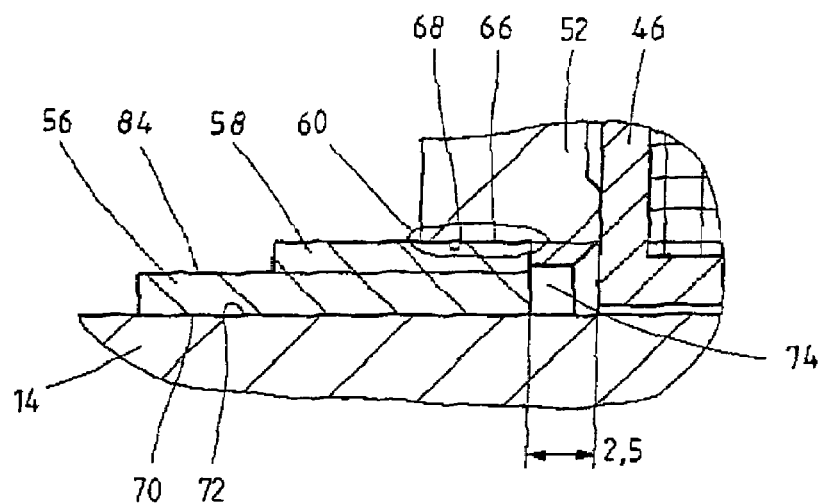
FIG. 3 is the detail of FIG. 2 with the rotary sleeve in an adjusted position.

FIGS. 2 and 3 show the enlarged detail x from FIG. 1, in which the rotary sleeve 56 with the overlap range 60 is represented. The difference between FIGS. 2 and 3 is that in FIG. 2, the rotary sleeve 56 is represented in its basic position, i.e., maximum overlap range 60 or no rotation, respectively, and in FIG. 3 in an adjusted position with a reduced overlap range 60 at a rotation of approximately 2.5 times.

In accordance with FIG. 2, the rotary sleeve 56 has a body section 58 for forming the overlap range 60, and a surface of attack 84 for the application of a tool.

The body section 58 has on its peripheral surface 66 a external thread that engages an internal thread of a bottom peripheral surface 68 of the housing jacket 48. The ranges of the rotary sleeve 56 and of the bottom 52 thus overlapping form the overlap range 60. Ideally the peripheral surface 66 has a greater axial extension than the bottom peripheral surface 68. The cross-sections of the magnetic circuit are adapted such that a critical throttle cross-section of the magnetic circuit that limits the magnetic force in the excited condition is situated in the overlap range 60 between the peripheral surface 66 and the bottom peripheral surface 68. Depending on the rotational movements or rotations, and the axial displacement of the rotary sleeve 56, magnetic throttling is modified across the overlap range 60 to thus change the magnetic force. The magnetic force here increases with an increase of the overlap range 60.

The surface of attack 84 is radially stepped back in comparison with the peripheral surface 66 of the body section 58, so that on the one hand it is possible to securely apply the tool from outside, and on the other hand the external thread may easily be applied on the body section 58.

The rotary sleeve 56 is guided axially on the tube body 14, with a narrow ring gap being formed between an inner peripheral surface 70 of the rotary sleeve 56 and an outer circumferential portion 72 of the tube body 14.

In the basic position, i.e., maximum overlap range 60, the rotary sleeve 56 contacts the end side of the coil support 46. Upon a corresponding rotation, it is displaced to the left away from the coil support 46. In this case an air gap 74 forms between the bottom 52 and the tube body 14, whereby the overlap range 60 and thus the throttle cross-section is reduced (FIG. 3), for only a partial range of the peripheral surface 66 remains in contact with the bottom peripheral surface 68. The air gap 74 acts as an insulator in practice and prevents a formation of the magnetic circuit over the entire axial length of the bottom peripheral surface 68. The insulation effect across the air gap 74 increases with the radial extent, i.e., the thickness, of the rotary sleeve 56.

Figure 4:
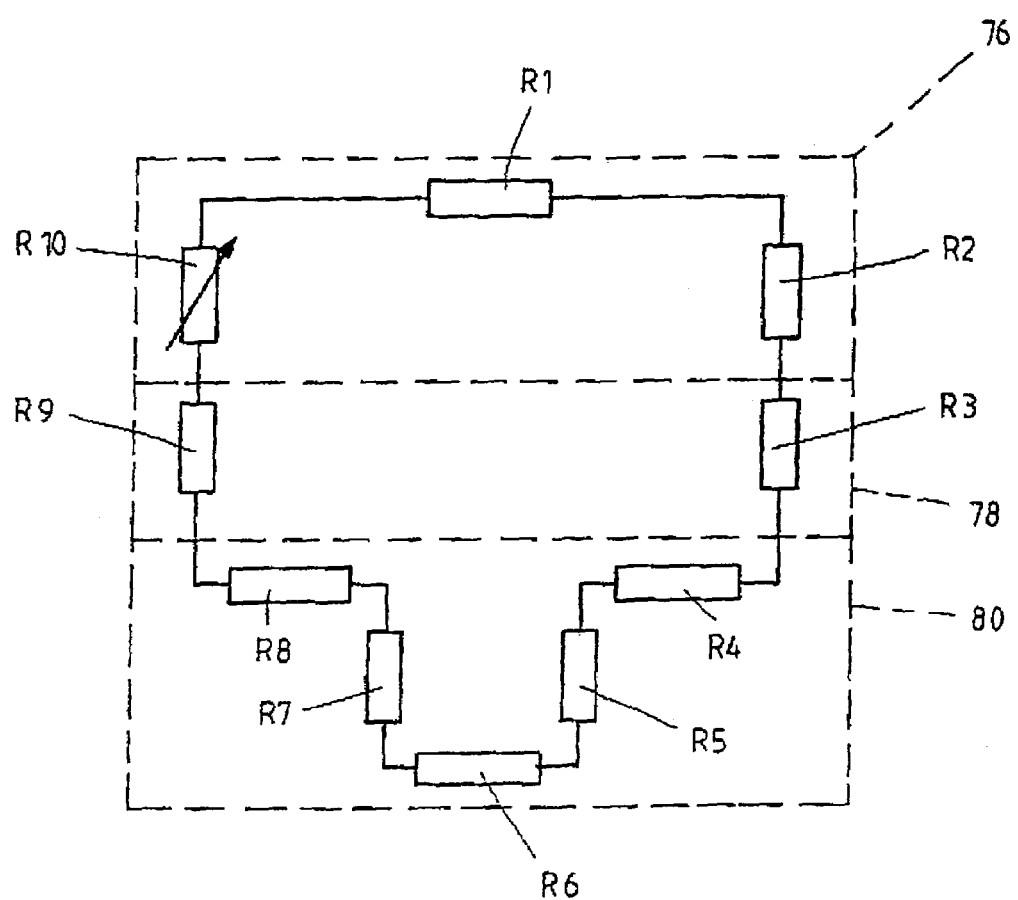
FIG. 4 shows a diagram of the resistances of the linear solenoid of FIG. 1.

FIG. 4 shows essential existing resistances R1 to R10 of the linear solenoid 2. The resistances R1 through R10 may be classified into the blocks of "coil" 76, "coil/pole tube" 78, and "pole tube" 80.

The "coil" block 76 is essentially determined by the adjustable resistance R10 of the rotary sleeve 56, the resistance R1 of the housing jacket 48 through its axial length including the bottom 52, and the resistance R2 of the pole disc 62.

The "coil/pole tube" block 78 is defined mainly through the resistance R3 of the manufacturing gap between the pole disc 62 and the pole 10 and the resistance R9 of the ring gap between the tube body 14 and the rotary sleeve 56.

The "pole tube" block 80 is determined by the resistance R4 of the pole 10, the resistance R5 of the axial working gap, the resistance R6 of the armature 4, the resistance R7 of the radial gap between the armature 4 and the tube body 14, and the resistance R8 of the tube body 14.

When the coil 44 is energized, the magnetic circuit forms as follows. The designated direction is to be understood by way of example and is, of course, reversible with opposite energization: From the housing jacket 48 (R1) the magnetic field lines extend through the pole disc 62 (R2) and from there via the manufacturing gap (R3) to the pole 10 (R4). From the pole 10 (R4) they propagate via the axial working gap (R5) through the armature 4 (R6) and from there via the radial gap (R7) into the tube body 14 (R8). From the tube body 14 (R8), the field lines form via the ring gap (R9) in the rotary sleeve 56 (R10) and from there, finally, into the housing jacket 48 (R1). The magnetic circuit is thus closed.

Figure 5:
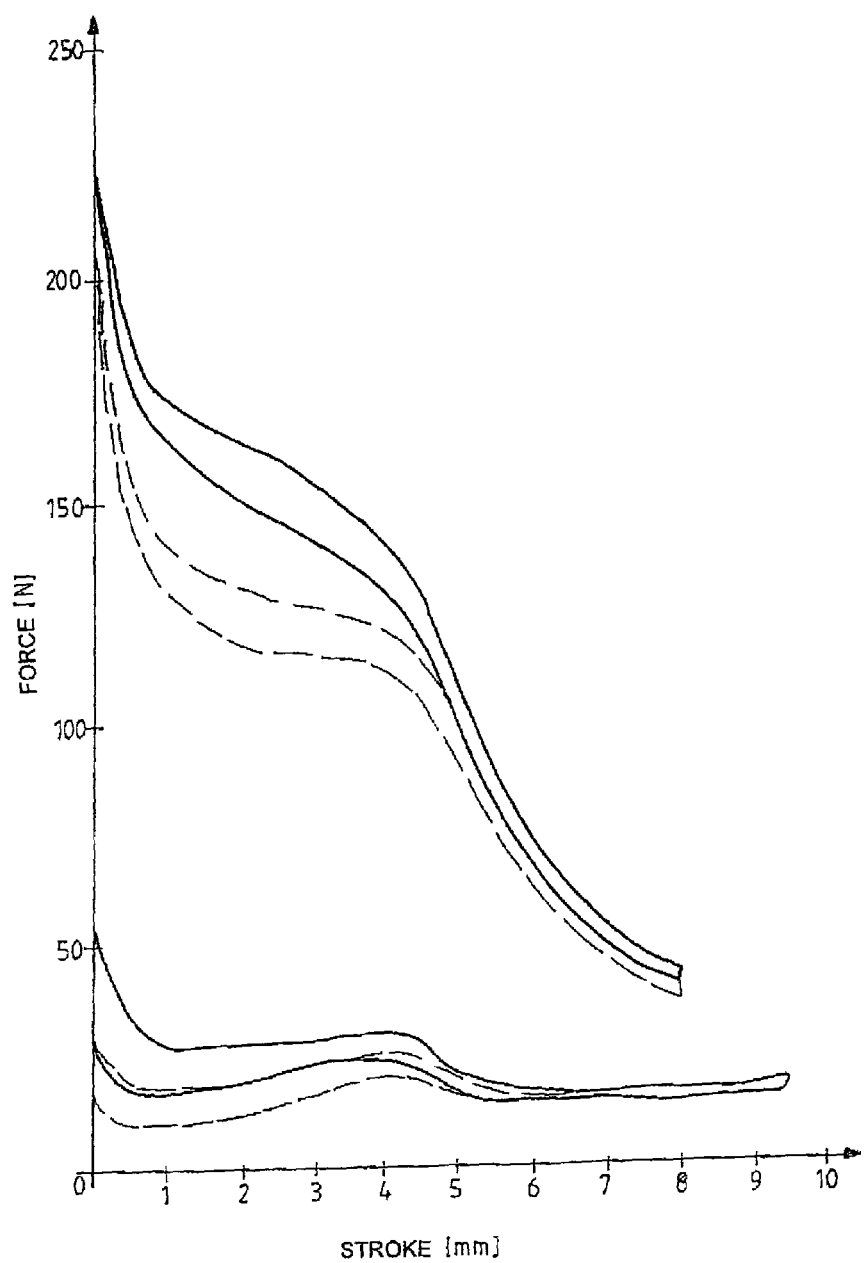
FIG. 5 shows force/stroke characteristic lines for changing exciting currents and rotations of the rotary sleeve.

FIG. 5 is a diagram of force/stroke characteristic lines for changing exciting currents and rotations of the rotary sleeve 56. Here the armature 4 is moved stepwise by a certain stroke from its de-energized home position and immobilized. Subsequently the coil 44 is energized. The magnetic forces manifesting in the process then result in the hysteresis-type characteristic lines.

In order to achieve a nearly horizontal force/stroke characteristic line in the working range, the linear solenoid 2 may have the form of a force-controlled, displacement-controlled, or position-controlled proportional magnet.

The solid characteristic lines correspond to a maximum overlap range, i.e., no rotation and thus no air gap 74, at 15% operating current (lower characteristic line) and at 100% operating current (upper characteristic line).

The dashed characteristic lines correspond to a reduced overlap at a 2.5-time rotation of the rotary sleeve 56, i.e., distinct air gap 74, at 15% operating current (lower characteristic line) and at 100% operating current (upper characteristic line).

From the characteristic lines it may be clearly seen that at both 15% and 100% operating current, with a 2.5-time rotation of the rotary sleeve 56 and thus a reduced overlap range 60, the magnetic force is markedly reduced in comparison with the maximum overlap range 60.

What is disclosed is a linear solenoid, the magnetic force of which is adjustable from outside in the mounted condition through an axial translation of a component which is in operative connection with a pole tube and defines an overlap range with a housing jacket, and a magnetic valve equipped with such a linear solenoid.

The invention claimed is:

1. A linear solenoid, comprising:
    a pole tube;
    a housing jacket that encloses the pole tube;
    a coil that encompasses the pole tube; and
    a displaceable armature that is received in the pole tube,
    wherein an overlap range between the housing jacket and an axially displaceable component that is in operative connection with the pole tube is adjustable in order to adjust a magnetic force,
    wherein the component is adapted to be actuated from outside in a mounted condition of the linear solenoid, and
    wherein the pole tube guides the component axially and the component has an external thread engaged with an internal thread of the housing jacket.

2. The linear solenoid in accordance with claim 1, wherein the component is a rotary sleeve.

3. The linear solenoid in accordance with claim 2, wherein a body section of the rotary sleeve, having the external thread, has a greater axial extension than a body range of the housing jacket, having the internal thread.

4. The linear solenoid in accordance with claim 2, wherein the rotary sleeve is arranged on a side of the displaceable armature, the pole tube axially protrudes from the housing jacket to such an extent that the rotary sleeve is over an entire inner peripheral surface of the pole tube, and the rotary sleeve is guided on the pole tube irrespective of an axial displacement of the rotary sleeve.

5. The linear solenoid in accordance with claim 2, wherein the rotary sleeve is formed with a radially stepped-back surface for the application of a tool.

6. The linear solenoid in accordance with claim 1, wherein the linear solenoid is a proportional magnet.

* * * * *